Figure 1:
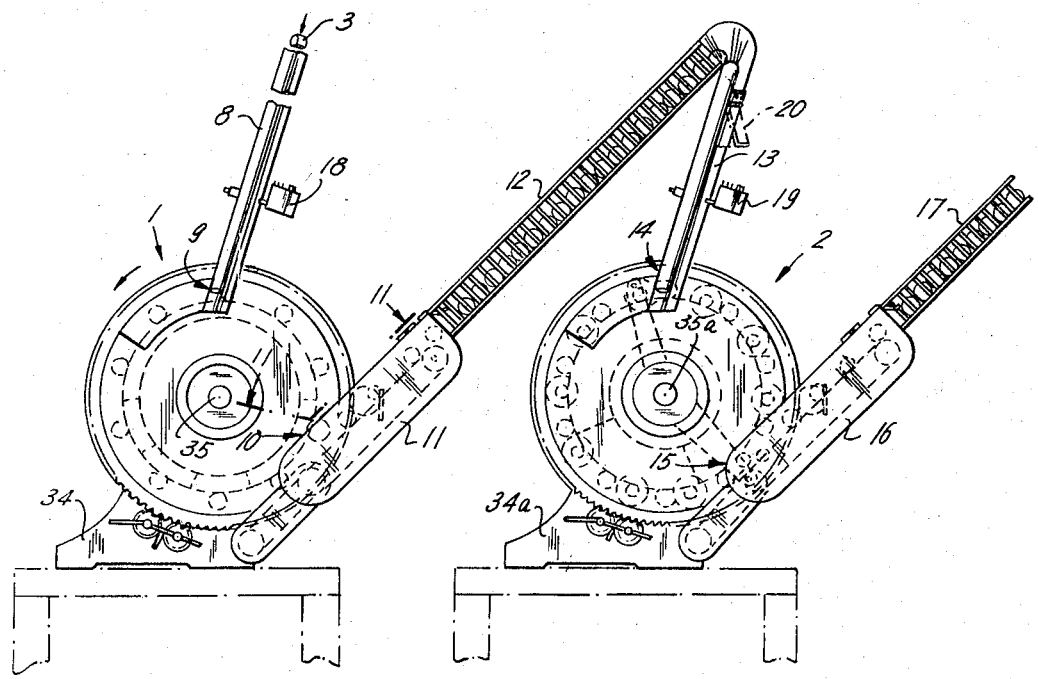

March 28, 1967 C. ANDREW ET AL 3,311,077
MACHINE FOR MAKING NON-PILFERABLE BOTTLE CAPS
Filed July 24, 1963 10 Sheets-Sheet 1

INVENTORS
CHARLES ANDREW
FRANK WAITKENS
BY FINN D. MICHAELSEN

Pennie, Edmonds, Morton, Taylor & Adams
ATTORNEYS

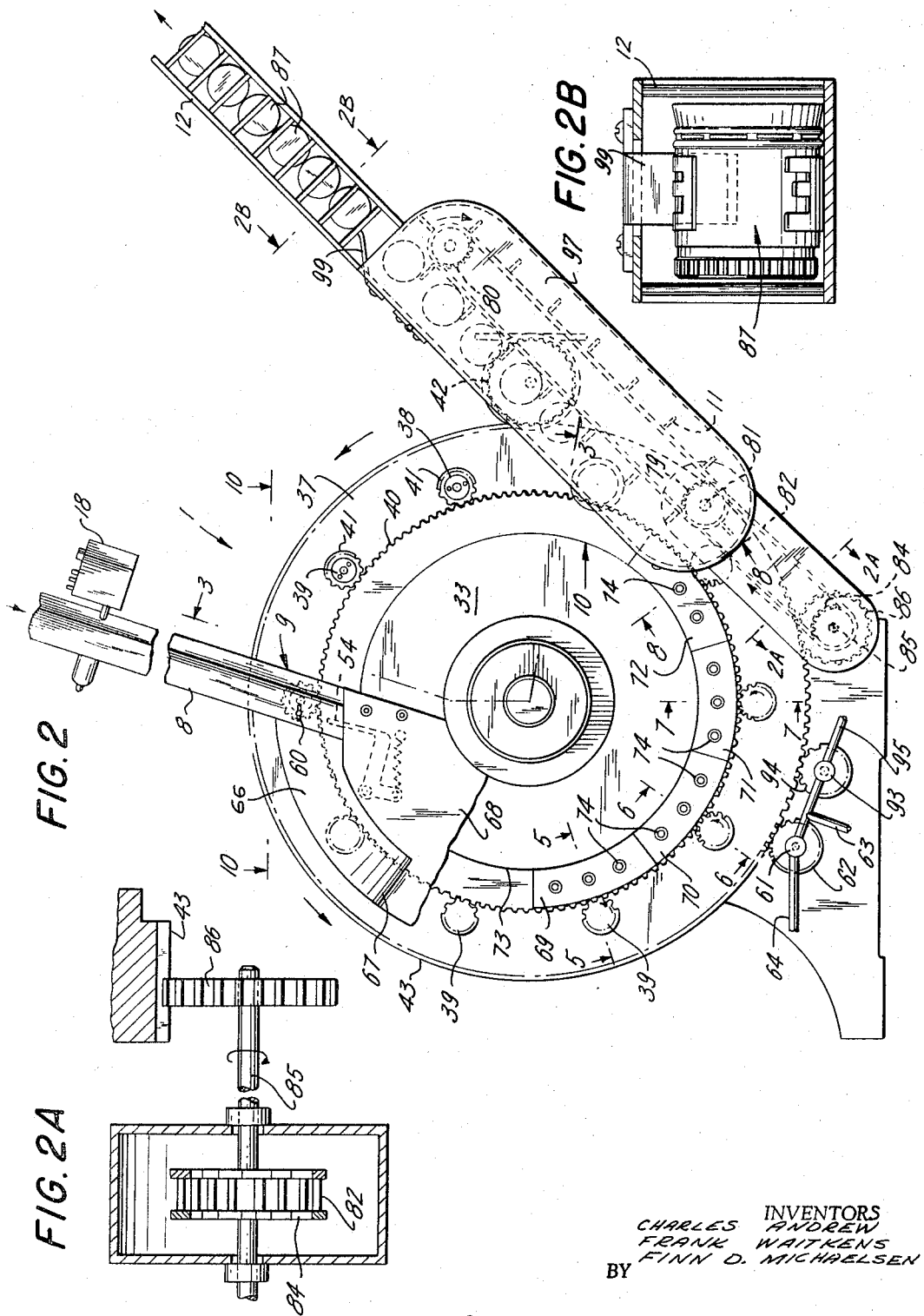

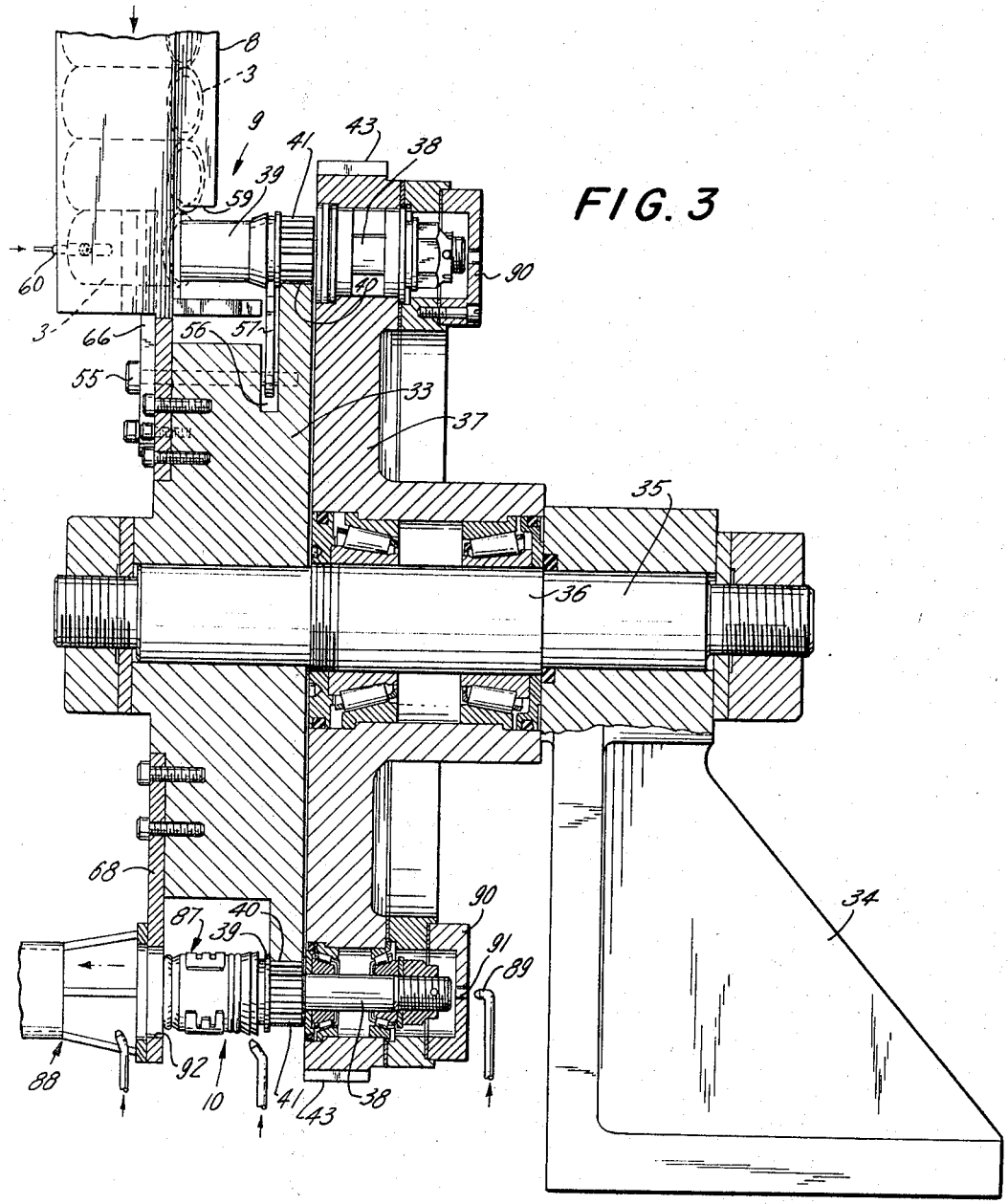

March 28, 1967 C. ANDREW ET AL 3,311,077
MACHINE FOR MAKING NON-PILFERABLE BOTTLE CAPS
Filed July 24, 1963 10 Sheets-Sheet 4

INVENTORS
CHARLES ANDREW
FRANK WAITKENS
FINN D. MICHAELSEN
BY
Pennie, Edmonds, Morton, Taylor & Adams
ATTORNEYS

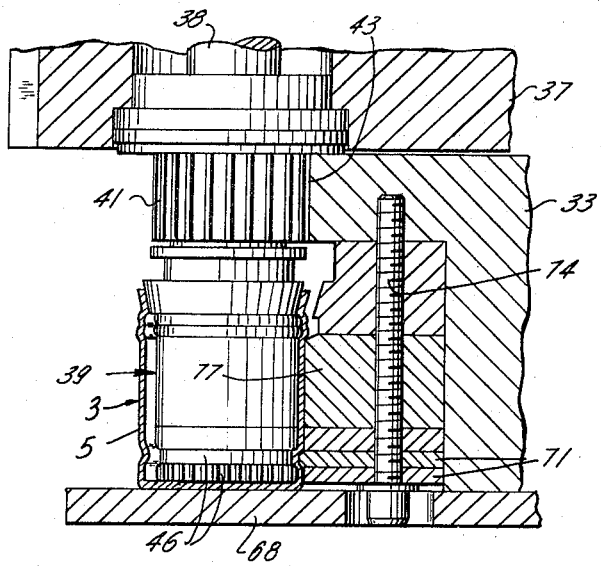
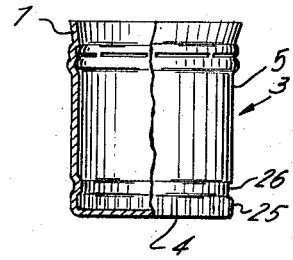
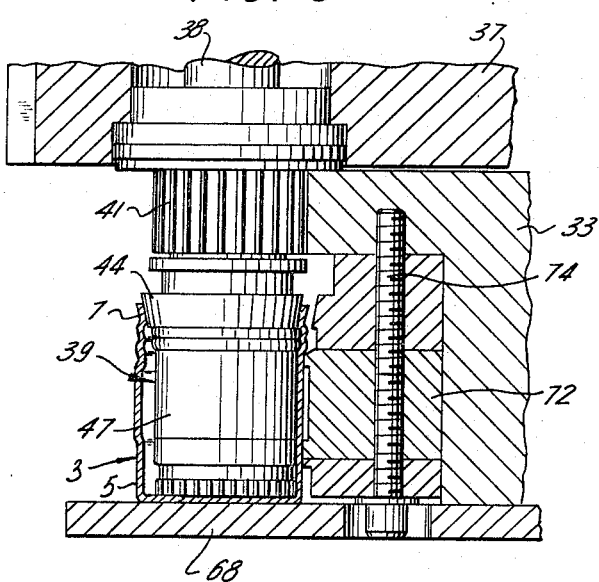
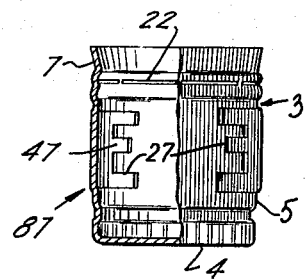

INVENTORS
CHARLES ANDREW
FRANK WAITKENS
FINN O. MICHAELSEN
BY

Pennie, Edmonds, Morton Taylor & Adams
ATTORNEYS

March 28, 1967

C. ANDREW ET AL 3,311,077

MACHINE FOR MAKING NON-PILFERABLE BOTTLE CAPS

Filed July 24, 1963

10 Sheets-Sheet 7

INVENTORS
CHARLES ANDREW
FRANK WAITKENS
FINN O. MICHAELSEN
BY

Pennie, Edmonds, Morton, Taylor & Adams
ATTORNEYS

March 28, 1967  C. ANDREW ET AL  3,311,077
MACHINE FOR MAKING NON-PILFERABLE BOTTLE CAPS
Filed July 24, 1963  10 Sheets-Sheet 8
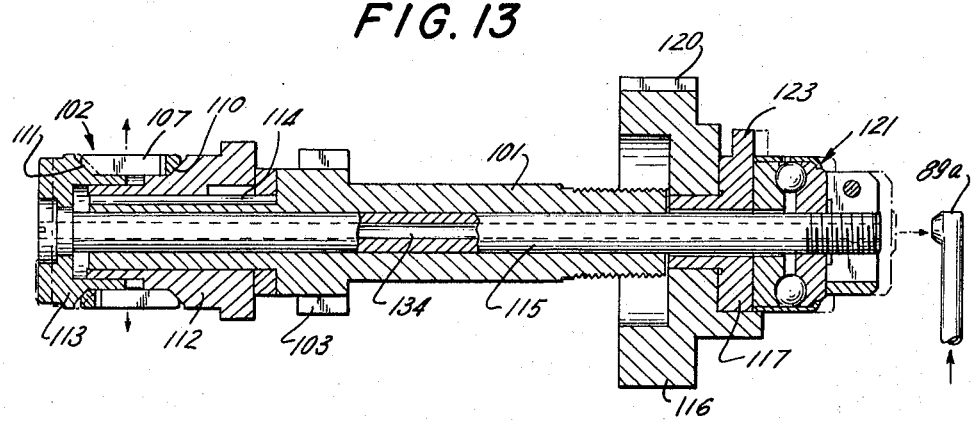
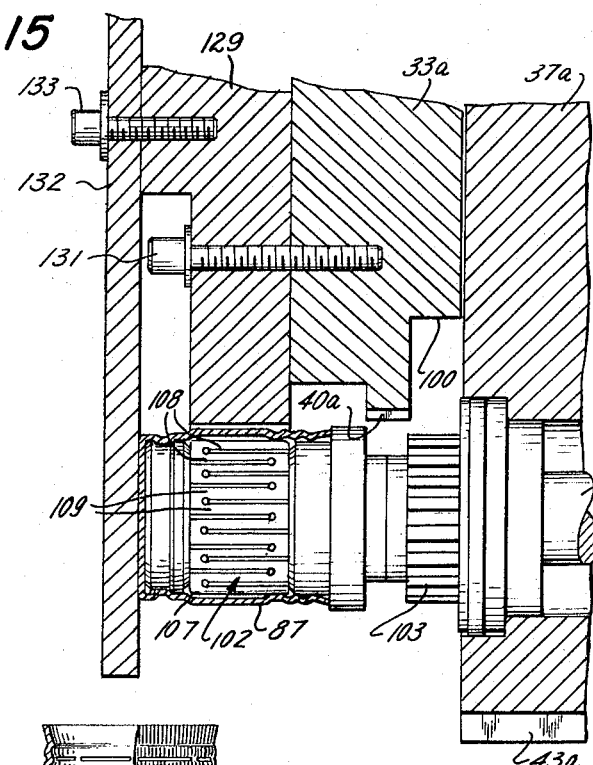
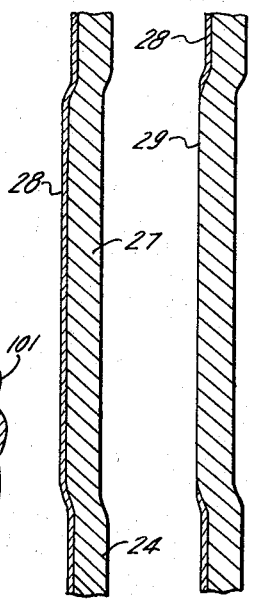
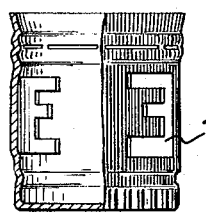
INVENTORS
CHARLES ANDREW
FRANK WAITKENS
BY FINN D. MICHAELSEN
Rennie, Edmonds, Morton, Taylor & Adams
ATTORNEYS March 28, 1967 C. ANDREW ET AL 3,311,077
MACHINE FOR MAKING NON-PILFERABLE BOTTLE CAPS
Filed July 24, 1963 10 Sheets-Sheet 9

INVENTORS
CHARLES ANDREW
FRANK WAITKENS
BY FINN D. MICHAELSEN

Pennie, Edmonds, Morton, Taylor & Adams
ATTORNEYS

March 28, 1967  C. ANDREW ET AL  3,311,077
MACHINE FOR MAKING NON-PILFERABLE BOTTLE CAPS
Filed July 24, 1963  10 Sheets-Sheet 10

INVENTORS
CHARLES ANDREW
FRANK WAITKENS
BY FINN D. MICHAELSEN

Pennie, Edmonds, Morton, Taylor & Adams
ATTORNEYS

United States Patent Office 3,311,077
Patented Mar. 28, 1967

3,311,077
MACHINE FOR MAKING NON-PILFERABLE
BOTTLE CAPS
Charles Andrew, Brooklyn, Frank Waitkens, Jamaica, and Finn D. Michaelsen, Amityville, N.Y., assignors to Andrew-Waitkens Machine Co., Inc., New York, N.Y., a corporation of New York
Filed July 24, 1963, Ser. No. 297,465
10 Claims. (Cl. 113—1)

This invention relates to improvements in machines for making one-piece, non-pilferable closures for bottles or other containers formed from elongate cup-like metallic blanks.

A non-pilferable closure comprises an elongate cup-like member having a top portion which is usually flat and from which depends a cylindrical skirt having a main or upper section containing embossed matter, such as the name or trademark of the product in the container, and a lower section usually narrow in width and which is crimped to a bead or other formation on the neck of the container so that it is permanently secured thereto.

The two sections, that is, the narrow lower section and the upper or main section are connected to one another by means of "bridges" which are formed by beading, scoring and perforating the skirt on a circular area joining the two sections, leaving elongated slits separated by narrow inter-connections between the two sections which form the bridges. These are breakable by turning or twisting the upper section of the closure cap when it is desired to open the bottle or container. This upper section is customarily provided with screw threads, which engage corresponding threads on the neck of the container, so that such upper section can be used for reclosing the container.

The closure cap is provided with a lining disc which is fitted against the inner surface of the top of the cap. The closure is usually coated with a coloring composition of a color which contrasts with the natural color of the metal. Aluminum is the metal which is preferred. In order to make the name design or other embossed matter on the exterior surface of the skirt portion understood at a glance and more attractive the tips of the embossed matter are shaved off or polished so as to cause it to stand out in sharp contrast to the background color of the closure.

As indicated previously, the present invention relates to an improved apparatus for accomplishing the beading, scoring, knurling, grooving and embossing operations, and especially the shaving operation. The objects are to provide apparatus by which the beading, scoring, knurling, grooving and embossing operations, on the one hand, and the shaving operation on the other hand, can be performed at a much higher rate of production than by the apparatus heretofore in use, and by which the quality of the product is made at least equal to that of the machines heretofore in use; and to provide an apparatus for performing all of the operations referred to, which is economically feasible for installation in the plant of the user of the non-pilferable closures.

Figure 4:
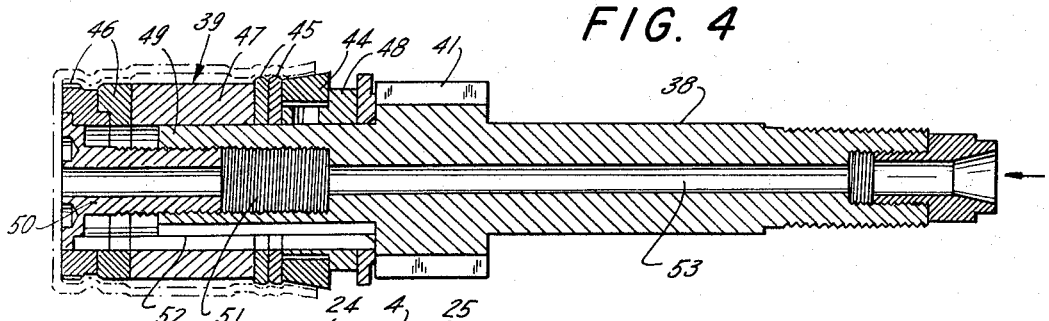
Figure 1A:
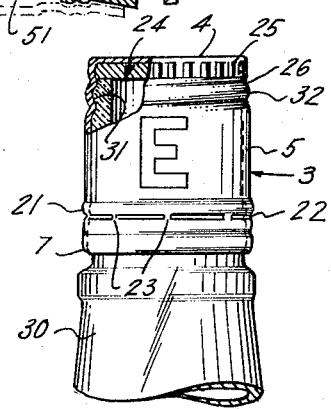
Figure 5:
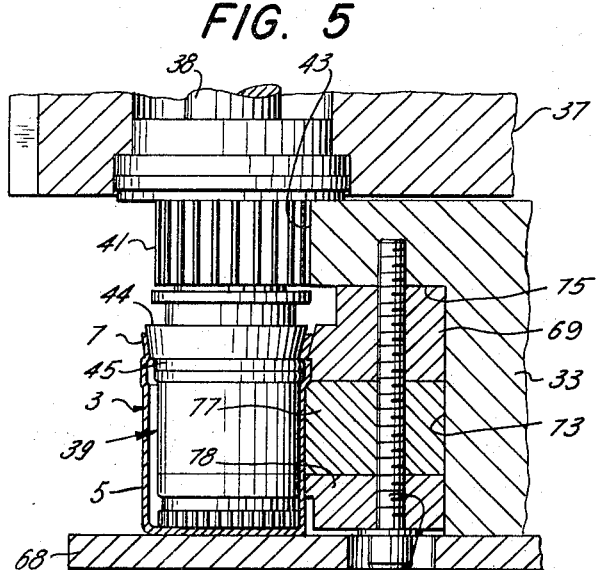
Figure 5A:
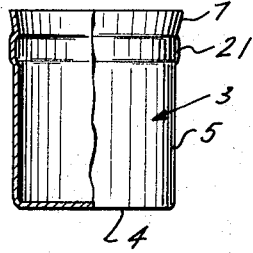
Figure 6:
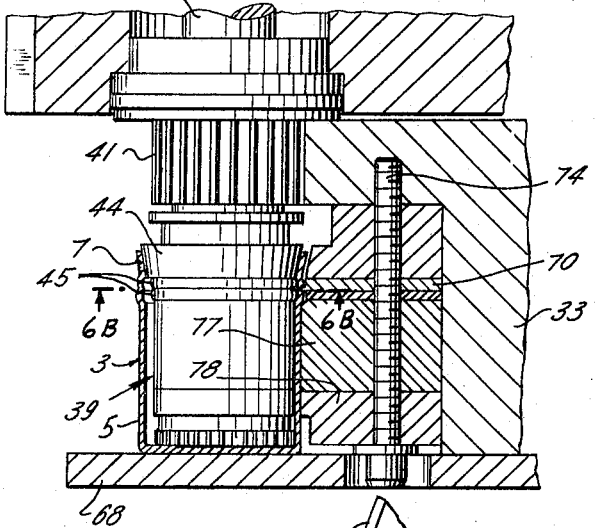
Figure 6A:
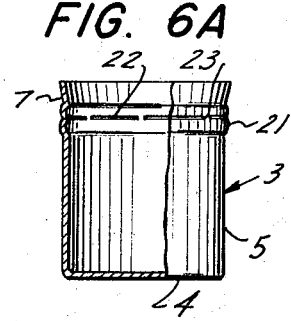
Figure 6B:
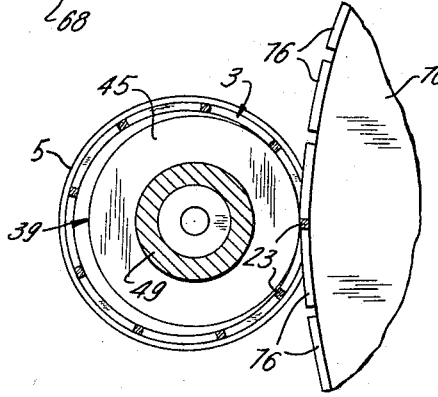
Figure 9:
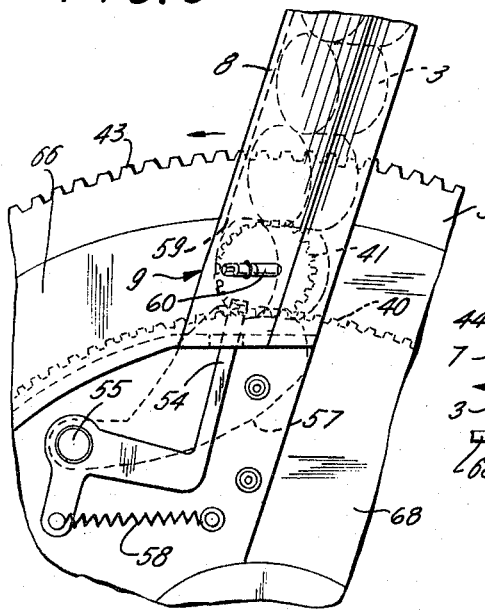
Figure 10:
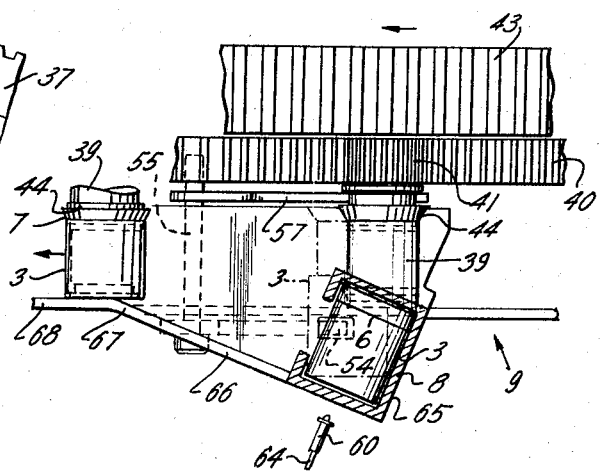
Figure 11:
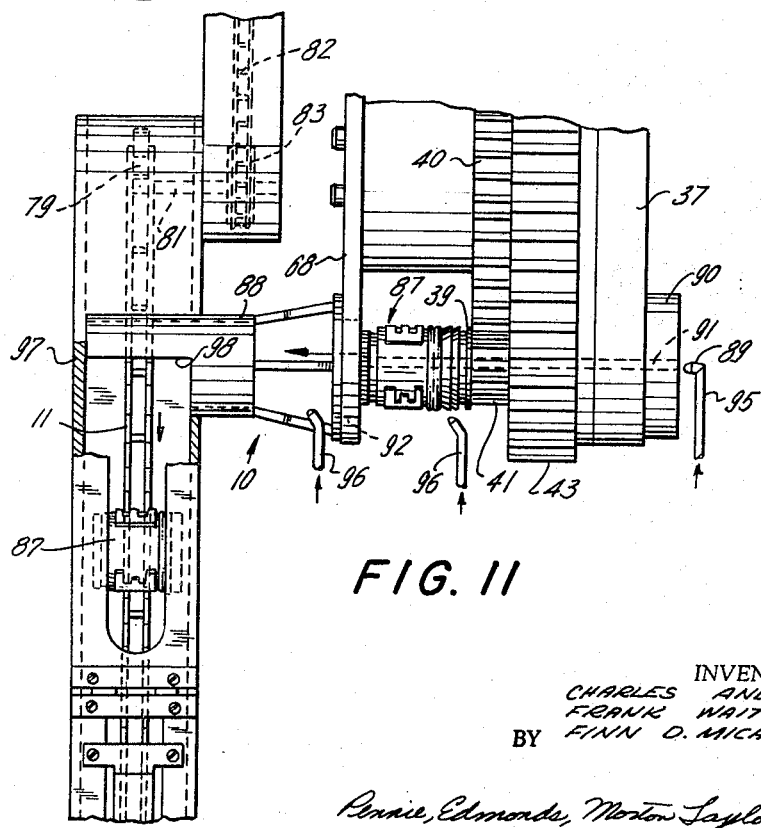
Figure 12:
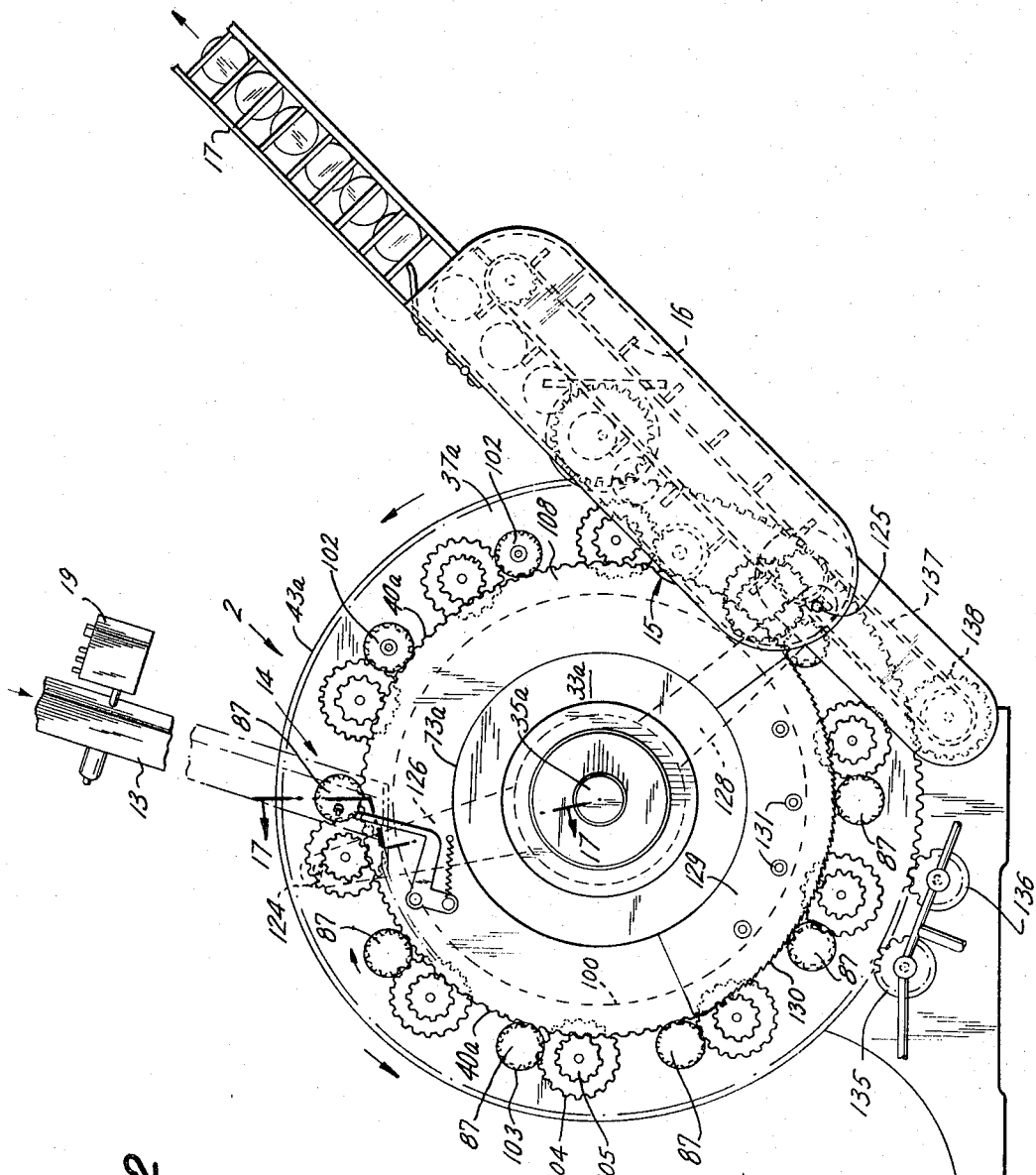
Figure 14:
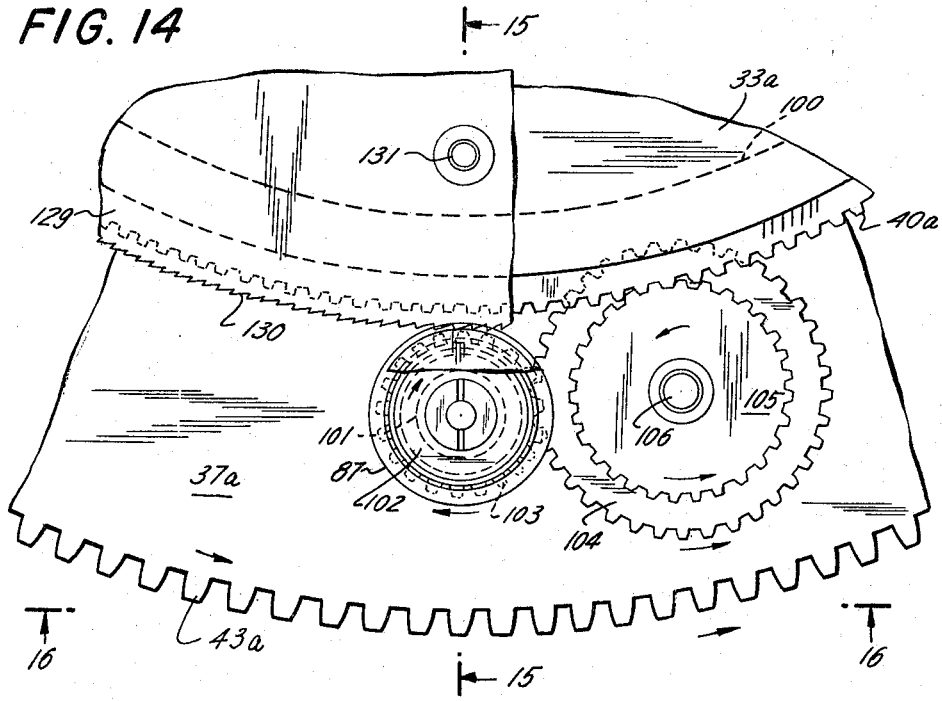
Figure 16:
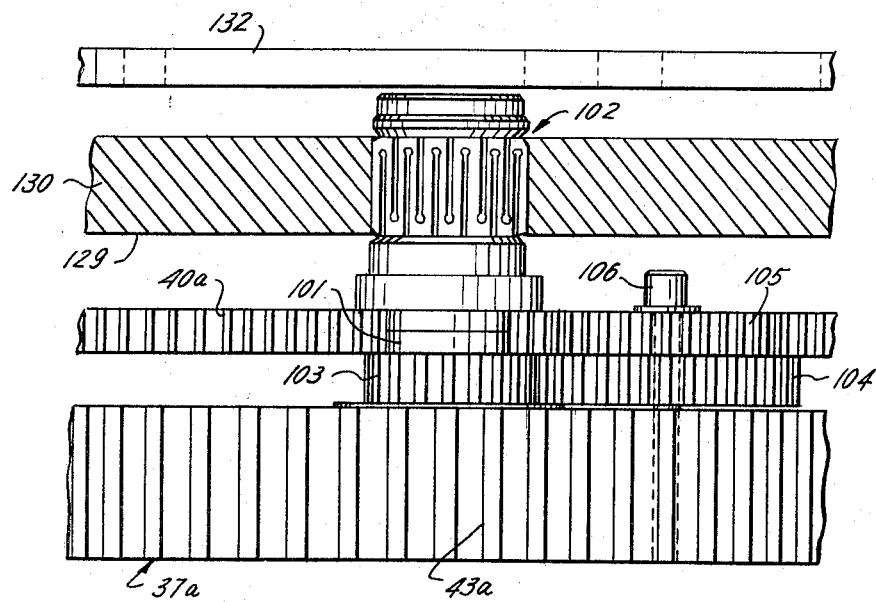
Figures 17, 18:
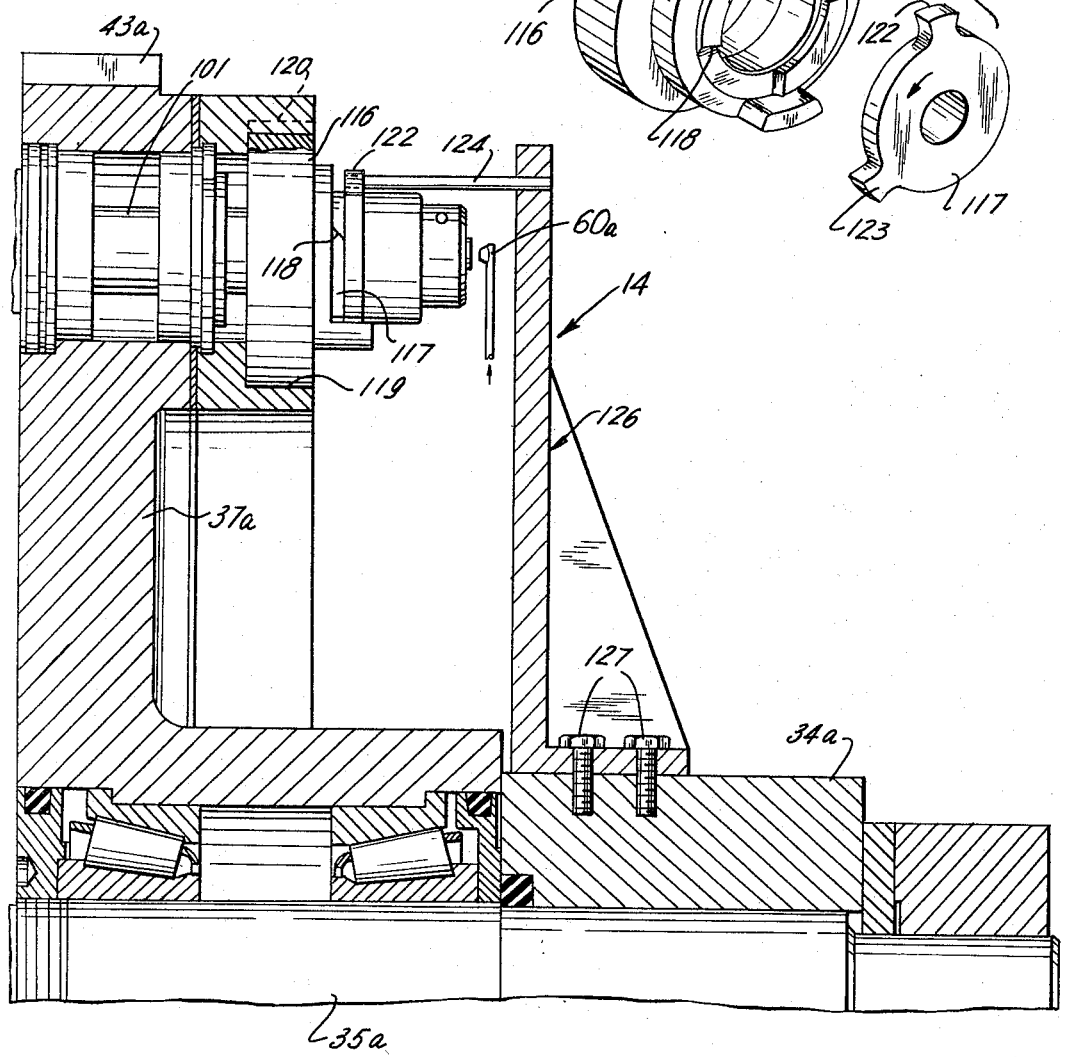

Other advantages of the invention will be apparent from the following description of the apparatus as shown in the accompanying drawings, it being understood that the invention is not limited either to the specific form of the apparatus illustrated, or to that set forth in the description following:

In these drawings:
FIG. 1 is a view of the complete apparatus in front elevation;
FIG. 1A is a fragmentary view partly in elevation and partly in section showing a non-pilferable cap in position on the neck of a bottle;

FIG. 2 is a view similar to FIG. 1 showing the machine for beading, flaring, scoring, knurling and embossing the caps, drawn to an enlarged scale and with the front or pressure plate largely broken away;
FIG. 2A is a detailed section taken on line 2A—2A of FIG. 2 and shows a cap leaving the forming machine of FIGS. 2-11 and ready for the shaving operation;
FIG. 2B is a detailed section on line 2B—2B of FIG. 2;
FIG. 3 is a sectional view taken on broken line 3—3 of FIG. 2 and drawn to a still larger scale;
FIG. 4 is a view in central section of one of the spindles and its work shaping mandrel;
FIG. 5 is a sectional view one line 5—5 of FIG. 2 showing the beading mechanism;
FIG. 5A is a view partly in elevation and partly in section showing a cap blank after beading and flaring;
FIG. 6 is a view similar to FIG. 5 taken on line 6—6 of FIG. 2 showing the scoring mechanism;
FIG. 6A is a view similar to FIG. 5A after showing the cap blank after scoring and perforating;
FIG. 6B is a detailed section taken on line 6B—6B of FIG. 6;
FIG. 7 is a view similar to FIG. 5 taken on line 7—7 of FIG. 2 showing the mechanism for knurling and forming the retaining groove;
FIG. 7A shows a cap after knurling and forming the retaining groove;
FIG. 8 is also a view similar to FIG. 5 taken on line 8—8 of FIG. 2 showing the embossing mechanism;
FIG. 8A shows a cap after the embosisng operation;
FIG. 9 is an enlarged elevation of a portion of FIG. 2 showing the infeeding mechanism for the cap blanks;
FIG. 10 is a sectional view taken on line 10—10 of FIG. 2;
FIG. 11 is a sectional view taken on broken line 11—11 of FIG. 1 drawn to an enlarged scale and showing the mechanism for discharging and conveying the caps;
FIGS. 12-18 illustrate the shaving machine;
FIG. 12 is a view similar to FIG. 2 showing the shaving machine with the pressure plate removed;
FIG. 13 is a view in central section showing a spindle for the shaving machine and its expansion mandrel;
FIG. 14 is a view in front elevation of part of the machine of FIG. 12 drawn to an enlarged scale and showing a spindle drive;
FIG. 15 is a vertical section taken on line 15—15 of FIG. 14;
FIG. 15A shows a cap after the shaving operation is completed ready for shipment to the user, or the insertion of the lining disc;
FIGS. 15B and 15C are enlarged detailed sections through the cap skirt to indicate the removal of material by the shaving operation;
FIG. 16 is a view of the mechanism shown in FIG. 14 looking from the bottom in the direction of arrows 16—16;
FIG. 17 is a vertical section taken on broken line 17—17 of FIG. 12 and drawn in an enlarged scale; and
FIG. 18 is a perspective view of the cam members shown at the right of FIGS. 13 and 17.

As shown in FIG. 1, the machine is made in two sections indicated respectively by numerals 1 and 2. The flaring, beading, scoring, knurling, grooving and embossing operations are accomplished in section 1, which will be referred to as the forming section, whereas the shaving operation is performed in section 2, which will be referred to as the finishing or shaving section. The blanks or "shells" from which the closure caps are made are drawn to elongated cup-like form as shown at 3 in FIGS. 1 and 10 (lower right). These blanks each have a flat top portion 4 (FIG. 1A) and an elongated cylindrical skirt portion 5, that is, the skirt is considerably longer than the diameter. They are preformed from thin sheet metal, usually aluminum, and each cap has a light external circular score line 6 (FIGS. 5A and 10) spaced at a suitable distance from the open end of the shell for the formation of a flared portion 7, as will be presently described.

The shells 3 are fed into section 1 of the apparatus by means of a feed hopper in the form of a chute 8 which is slightly inclined from the vertical, the lower end there of delivering the shells to an in-feed station 9. After the cap blanks 3 have been flared, beaded, scored, knurled, grooved and embossed in forming section 1 they are removed at a discharge station 10 into a short, endless, flight conveyor 11 which delivers them into the lower end of an upwardly inclined chute 12. The partially completed closure caps are discharged at the upper end of this chute into a second downwardly inclined hopper chute 13 by which they are delivered to an in-feed station 14 for section 2 of the apparatus.

In finishing section 2 the tops of the embossed matter are shaved off as previously mentioned and the completed closure caps leave section 2 at discharge station 15 where they are received by a second flight conveyor 16 which moves the caps upwardly into and within a second upwardly inclined chute 17. This chute may convey the caps to a machine for inserting sealing disc or liners against the inner tops of the caps, the caps thereafter being applied to the bottles or other containers.

The in-feed chute 8 of forming section 1 is provided with an electric eye device 18 beamed across the channel of the chute and arranged by mechanism not shown to shut down the operation of section 1 should the continuous supply of shells 3 fail, these shells being normally fed in a continuous line with one shell resting on another side against side.

A similar electric eye device 19 is provided in in-feed chute 13 for the finishing section 2, and operates in a similar manner to stop the operation of this section if there is a failure of the supply of partially finished caps in this chute.

Chute 13 is further supplied with a safety door 20 which is arranged in one side of the chute and which is hinged at its upper end. Door 20 is spring pressed to closed position by means of a spring device (not shown). Should the endless conveyor 11 and chute 12 produce an over-supply of partially completed shells at the upper end of chute 13, safety door 20 will be opened by the pressure of the shells so as to allow the surplus to be released from the chute and thus prevent damage to the shells. Such surplus may be received in any desired manner as by means of a receptacle, or additional chute or tray (not shown).

The closure cap is shown in various stages of completion in the following figures of the drawing: in FIG. 10 at the lower right the blank or shell 3 is shown before any operation has been performed upon it, and is in the condition as previously described. At the left of FIG. 10 the flared portion 7 has been formed. In FIG. 5A a bead 21 has been added adjacent the flared portion 7. In FIG. 6A the beaded portion 21 has been scored centrally at 22 along a circular line producing elongated cuts separated by narrow interconnecting portions or "bridges" 23 interconnecting the flared portion 7 with the main or skirt portion 5 of the cap. In FIG. 7A knurling 25 and a disc liner retaining groove 26 have been formed just beneath the top 4 or the cap.

In FIG. 8A embossing 27 in the form of the letter E has been formed on the outer surface of the main or skirt portion 5 of the cap. Such embossing may consist of the product name, trademark, or an ornamental design, or other matter, and the embossing is usually placed on the opposite sides of the skirt portion of the cap, although it may, if desired, be placed at additional locations and in various angular positions. FIG. 15A shows the embossed cap after the finishing or shaving operation, the greatly enlarged views 15B and 15C indicating the amount of material of the cap which is removed by the shaving operation.

The closure caps customarily have a thin coating of color and quite often a bright color such as red, gold, etc. In FIGS. 8A, 15B and 15C this color coating is shown extending over the embossed portion 27, such layer being indicated at 28 in FIGS. 15B and C. Thus the embossed matter is scarcely distinguishable from the background color on the surface of the cap. However, after the shaving operation the layer of color coating 28 which covers the tops of the embossed matter is removed along the line 29 shown in FIG. 15C which is slightly below the outer surface of the material so that the outline of the embossed material stands out in relief against the overall color of the coating material on the cap (FIG. 15A).

In FIG. 1A a complete closure cap mounted upon the neck 30 of a bottle is shown. The flared portion 7 at the bottom of skirt 5 has been spun over a formation on the bottle neck such as the bead shown, so that the portion below score line 22 is permanently secured to the bottle. In this condition the lining disc 24 is firmly held against the top edge of the bottle neck 30. Upon the exterior of the upper portion of the bottle neck about two threads 31 were formed when the bottle was made. A spinning tool is now applied to the exterior surface of the closure cap and threads 32 are thereby formed in the metal cap corresponding to the threads 31.

Threads 32 are located above the main embossed area of skirt 5 and are formed as a continuation of the retaining groove 26. It will be understood that the bottle can be opened only by twisting or turning the main portion 5 in a direction to unscrew the threads 32 and 31 and at the same time break the small interconnecting portions 23 between skirt portion 5 and the portion below score line 23 including flared portion 7.

Referring now to FIGS. 2–11, forming section 1 of the apparatus comprises a heavy circular supporting member 33, having a thick front portion of smaller diameter than its thinner flange-like rear portion. Support 33 is mounted in stationary position on a frame or base 34 by means of a large stationary shaft 35 which is fixed at its opposite ends to the respective parts 33 and 34. The central portion 36 of shaft 35 forms the support for a circular carriage 37, arranged to rotate with its flat front face adjacent the flat rear face of support 33. The hub of carriage 37 is mounted on central portion 36 by means of roller bearings as shown in FIG. 3.

A series of spindles 38, mounted on carriage 37 and having mandrels 39 projecting therefrom, project over the peripheral surface of stationary support 33. Spindles 38 are mounted in equally spaced position near the periphery of carriage 37, there being 10 of these spindles as shown in FIG. 2. These spindles are mounted for rotation on suitable bearings such as the roller bearings shown at the bottom of FIG. 3.

The inner, thinner and flange-like portion of support 33 is provided with gear teeth throughout its periphery to form a stationary spur gear 40. Spindles 38 are each provided with pinion teeth 41 which mesh with gear teeth 40 so that as the carriage 37 is rotated the spindles 38 are not only carried around support 33 in a circular path, but the spindles are rotated on their own axes. Carriage 37 is itself rotatably driven by means of a gear 42 which meshes with gear teeth 43 on the periphery of the carriage. Gear 42 is driven by a motor, such as an electric motor, (not shown) through a variable speed mechanism (also not shown), so that the output of the forming section 1 can be regulated to suit the operation of the finishing or shaving section 2. The rotation of carriage 37 is counterclockwise as shown by the arrow in FIG. 2.

Spindles 38 are all of the same construction and dimensions and likewise as to their mandrels 39. Each of these mandrels, as shown in FIG. 4, includes a flaring tool 44, a two-part beading tool 45, a two-part knurling and grooving tool 46 and an embossing tool 47. The flaring tool 44 has an internal diameter which is considerably larger than the diameter of its positioning ring or member 48, and although fitting snugly between the shoulder on ring 48 and the surface of beading tool 45, it also turns freely. The purpose of this floating mounting of flaring tool 44 will appear later on.

All of the tools mentioned above are supported either on a projection 49 of spindle 38 which extends outwardly beyond pinion 41 or on a retaining screw 50 which is threaded into an aperture 51 in the outer end of the spindle. All of these tools, except flaring tool 44, are keyed to the shaft projection 49 by means of a double key 52. Each of the spindles 38 is provided with a central longitudinal passageway 53 through which an air jet is directed in removing the closure cap from the mandrel, as will be referred to later on.

It will be understood that individual blanks or shells 3 are applied to the respective mandrels 39 as the move past the receiving position 9 (FIG. 2), and as the mandrels move past the discharge position 10, the formed closure caps are successively removed. While the spindles and mandrels are passing in the counterclockwise direction from receiving position 9 to discharge position 10, the several operations of flaring, beading, scoring, knurling-grooving, and embossing are performed in succession and in the order named. The flaring operation, while not a part of the in-feeding mechanism, is accomplished almost immediately after each shell is received at position 9, and a description of the in-feed mechanism will now be given.

The hopper chute 8 is a boxlike duct, rectangular in cross section and dimensioned to the size of the blanks or shells 8, one of which is shown within the chute 3 in FIG. 10. The blank or shell here indicated is the lowermost shell in chute 3 and is supported at the level of the mandrel 39 as its passes the chute by means of the front wall of the chute and the end of an upwardly extending finger 54. This finger is L shaped as shown in FIG. 9 and is fixed to the outer end of a small shaft 55 which is mounted for pivotal movement in an aperture extending through the thicker portion of support 33 to a slot 56 shown in FIG. 3. Arranged in this slot and also fixed to shaft 55 is an actuating arm 57 which extends upwardly and rearwardly into the path of the mandrels 39 as they are carried around by carriage 37.

Finger 54 is normally held at its upper position as shown in FIG. 9 by means of a tension coil spring 58. In this position the upper end of the finger is in front of the center of the lowermost shell as shown in FIGS. 9 and 10 and the shell is held partly by the finger and partly by the lower end 59 of the side and rear wall of chute 8 (FIG. 9).

As each of the mandrels 39 approaches the in-feed position 9 the outer end portion of the mandrel partially enters the outer hollow end of the lowermost shell in chute 8, this chute being disposed at a suitable angle with respect to the axis of the mandrel to permit such entry as indicated in FIGS. 9 and 10. At this instant of entry finger 57 is engaged by the mandrel, or spindle, which is entering the shell, and finger 54 is displaced so as to allow the lowermost shell to be carried forward by the mandrel beneath the lower end 59 of the chute front and rear walls. The shells 3 in chute 8 are supported one upon another, and as the lowermost shell moves forward the next shell takes its place, finger 54 having been returned immediately to its former position as shown in FIGS. 9 and 10.

At the same instant that the lowermost shell is released by the finger 54 a jet of air through a nozzle 60 is directed at the outer or closed end of the blank or shell, and moves the shell forward onto the mandrel. The commencement and duration of such air jet is controlled by means of a valve shown diagrammatically at 61 in FIG. 2. This valve is operated by a gear 62 which meshes with the teeth 43 on the periphery of rotating carriage 37. The arrangement is such that this valve is opened in timed relation to the depressing of finger 54 by each of the mandrels 39. Air is supplied to valve 61 through a connection 63 from a source of air under suitable pressure. The outlet of valve 61 is connected by tubing 64 to the nozzle 60.

As indicated in FIG. 10 and shown more clearly in FIGS. 5–8, the mandrels 39 are smaller in diameter than the inside diameter of the blanks or shells 3. This permits the application of the shells to the mandrels in the manner just described by means of the air jet, and also the ejection or discharge of the formed caps in a similar manner as will be later described; and it has an additional purpose which will be brought out presently.

The flaring of the mouth of the shell to produce the flared portion 7 is accomplished as shown in FIG. 10 soon after the shell moves away from the in-feed position 9. As the air jet moves the shell onto mandrel 39 the outer closed end of the shell 3, as shown in the dot and dash lines projects beyond the end of the mandrel and into the triangular area formed by wall 65 of chute 8 and an angular member 66 which projects forwardly from wall member 65. Angular member 66 is of arcuate shape in side view as shown in FIG. 2 and at its forward end 67 joins a circular plate 68, which will be referred to as a pressure plate.

As mandrel 39 leaves position 9 and carries the shell 3 forwardly in the direction of the arrow, the outer end of the shell comes in contact with the inner surface of the forward end or cam portion 67 of angular member 66. This end portion 67 serves as a cam which forces the shell farther onto the mandrel and onto flaring tool 44, and the open end of the shell becomes flared, the flared portion 7 being completely formed at this time as shown in FIG. 10. From this point on the outer ends of the respective shells are in contact with and slide along the inner surface of pressure plate 68 which is positioned close to the circular path of the outer ends of mandrels 39, being spaced from the mandrels only slightly more than the thickness of the shell ends.

As the blanks or shells 3 are carried forward on the respective mandrels 39, they encounter a series of stationary dies, namely a beading die 69 (FIGS. 2 and 4), a scoring die 70 (FIG. 6), a knurling and grooving die 71 (FIG. 7) and an embossing die 72 (FIG. 8). These dies are arcuate in shape as shown in FIG. 2, the pressure plate 68 being broken away in order to illustrate them in full lines. These dies are seated on their inner surfaces on a circular shelf 73 which forms the periphery of the thicker and smaller diameter portion of support 33.

The four dies are secured in position by means of screws 74 which pass through the dies and clamp them against the flat radial surface of the flanged portion of support 33. These respective dies cooperate successively with the corresponding tools on mandrel 39. Thus in FIG. 5 the beading tool 45 is shown in cooperative relation with the beading die 69 to form bead 21 (FIG. 5A). In FIG. 6 the scoring die 70 is shown in cooperative relation with the double beading tool 45 to cut the scoring slits 22 (FIG. 6A). Scoring die 70 is shown in enlarged detail in FIG. 6B. The elongated teeth 76 are shown cutting the slots 22 in the wall of the blank 3 leaving the interconnections or bridges 23 between the slits.

In FIG. 7 the double knurling and grooving dies 71 are shown cooperating with the knurling and grooving tool 46 on the mandrel to produce the formations 25 and 26 (FIG. 7A). Finally in FIG. 8 embossing die 72 is shown in cooperative relation with the embossing tool 47 to form the embossed matter 27 which in this instance consists of the capital letter E, the formation of this letter projecting outwardly from the surface from the tool 47 and being formed as a recess in the surface of die 72. The embossed matter may be placed at one, two, or more positions.

In each of the FIGS. 5–8 it will be observed that the work space between the cooperating tools on the respective mandrels corresponds to the thickness of the metal of the blank or shell 3, the respective tools and dies being in contact with the opposite work surfaces of the metal. On the other hand, the opposite inner surfaces of the shells at these respective positions are disposed at a distance from the work surfaces of the tools on the mandrel.

However, the previously formed flared portion 7 is in each instance in contact with flaring tool 44 throughout its circumference. The floating mounting of the flaring tool previously described permits the continuous lateral shifting of the flaring tool as the spindle and mandrel rotate in contact with the respective dies. The engagement of the flared portion 7 with flaring tool 44 remains throughout the travel of each blank or shell 3 from the flaring position which is adjacent in-feed position 9 (FIG. 10), to the discharge position 10 (FIG. 2). Such engagement is maintained by pressure plate 68 engaging the outer surfaces of the blanks or shells 3 as shown in FIGS. 5–8.

Only the portion of the shell which is between the tools on the mandrel and the dies is engaged by these forming members, and the arrangement of the pinions 41 and gear 43 is such that the peripheral speeds of the tools on the mandrels and the dies are the same. Hence the beading, scoring, knurling, grooving and embossing operations are true rolling operations.

The operation of beading is performed in a localized section or area of the skirt portion of the shell adjacent the smaller end of the flared portion 7. Thus while this beading operation takes place it is important to maintain the elongated skirt portion 5 in alignment with the mandrel, although axial alignment is impossible because of the necessary smaller diameter of the mandrel than the shell skirt so as to permit the true rolling operation between the mandrel tool and the stationary die, above described.

In order to maintain the desired alignment of the shell skirt with the mandrel, two blank or positioning die members 77 and 78 are mounted alongside die 69 in FIG. 5 and alongside die 70 in FIG. 6, blank die member 78 being mounted alongside of die member 77 near the opposite or top end of the shell. These two blank die members 77 and 78 serve to maintain the position of the shell in alignment with the mandrel during the cooperative action of beading tool 45 and beading die 69 in forming the bead 21.

These blank or positioning die members perform a similar function during the perforating of bead section 21 by the scoring die 70. When the shell reaches the knurling tool 71 in FIG. 7, the formation of the knurling and of the retaining groove 26 is localized at the opposite end of the skirt portion, that is, at the top of the cap. However, the same blank die members 77 and 78 engage the outer surfaces of the cap skirt to maintain the alignment of the elongated skirt during this operation.

The endless or flight conveyor 11 is positively driven by means of the mechanism shown in FIGS. 2, 2A and 11. Conveyor 11 is supported at its opposite ends on sprockets 79 and 80. Sprocket 79 is fixed to a short shaft 81 and this shaft is driven of an endless chain 82 which is trained around a sprocket 83 (FIG. 11) on shaft 81, and a sprocket 84 on a second shaft 85 (FIG. 2A) which is parallel to shaft 81. Shaft 85 is rotated by means of a gear 86 which meshes with gear teeth 43 on the carriage 37. The arrangement is such that the flights of conveyor 11 arrive opposite ejecting or discharge position 10 in timed relation to the movement of each completely formed cap off from the mandrel 39 at that position.

A completely formed cap ready to be transferred to the shaving or finishing section 2 of the apparatus is shown at 87 in FIGS. 2B, 3, 8A and 11. Opposite the mandrel 39 which is at position 10 there is a transfer cage 88 having a funnel shaped entrance section and a cylindrical discharge section. Cage 88 receives and directs the formed cap onto conveyor 11 and between two of its flights. At the rear side of carriage 37 there is an air jet nozzle 89 which directs a jet of air through the longitudinal passageway 53 that extends axially through each of the spindles 38 (FIG. 4).

A cover plate 90 is mounted on carriage 37 over the rear end of each of the spindles and these cover plates have central apertures 91 to permit the entrance of the air jet. The air jet blows or moves the formed cap 87 to the left, or forwardly in FIGS. 3 and 11, and the cap passes through an aperture 92 in pressure plate 68 which is arranged opposite the entrance to the funnel section of cage 88.

The commencement and duration of the air jet through nozzle 89 is controlled in a similar manner to that described above in connection with the air jet through nozzle 60 at the in-feed station 9. For this purpose a second control valve 93 is arranged as shown in FIG. 2 adjacent to valve 61 and is similarly operated by a gear 94 which meshes with the gear teeth on the rim of carriage 37. Air under suitable pressure, from the supply tube 63, passes through valve 93 and through tubing 95 to jet 89. During their movement the formed caps 87 are maintained in their horizontal position by means of cage 88 and with the assistance of air from one or more suitably placed nozzles 96.

The tops of the caps strike the interior surface of a cover plate 97 for the flight chain 11. The cap then is moved downwardly sidewise, partially by gravity and partly by one of the flights of conveyor 11, through the open lower side of cage 88 which is cut away for this purpose as shown in 98 in FIG. 11. The successive caps are in contact with one another side by side in the chute 12 after they leave the upper end of conveyor 11. In order to prevent the caps from sliding downwardly in the chute when the apparatus is stopped a flexible finger 99 which is fixed to the upper surface of chute 12 and projects downwardly through an aperture therein into the path of the caps.

Section 2 of the apparatus, which is the finishing or shaving section, is shown in FIGS. 12–18. The general arrangement of this apparatus is like that shown in FIGS. 1 and 3. That is to say, it has a circular heavy stationary support 33a which in general is similar to support 33 and which is mounted in fixed position on the forward end portion of a fixed shaft 35a (FIG. 1). Shaft 35a is mounted at its rear end on a frame 34a. Further, section 2 includes a rotary carriage 37a mounted to rotate on the central portion of stationary shaft 35 and with its forward flat face in close proximity to the rear flat face of support 33a.

The circular shelf 73a (FIG. 12) is somewhat smaller in diameter than the shelf 73 (FIG. 2). The configuration of the larger diameter portion of support 33a is somewhat different from support 33. The rear and larger diameter portion of support 33a is arranged with the circular row of gear teeth 40a spaced forwardly from the rear surface of the support as shown in FIG. 15, leaving a rear circular groove or recess 100 which accommodates the gear train for driving the spindles, as will presently appear.

The spindles are indicated by reference numeral 101 (FIG. 13) which, like spindles 38, are arranged in equally spaced relation around the outer portion of carriage 37a as shown in FIG. 12. Spindles 101 are each mounted for rotation in bearings indicated in FIG. 17 which are similar to the bearings which support spindles 38. Each of spindles 101 carries at its front end an expansion mandrel 102 of quite different construction than that of mandrels 39, this construction being described in detail further on.

Unlike spindles 38, whose direction of rotation on the carriage is the same as that of the carriage, spindles 101 and mandrels 102 are arranged to rotate in the opposite direction from carriage 37a. That is to say, carriage 37a rotates in the counterclockwise direction, as shown in FIG. 12 and the several spindles 101 and mandrels 102 rotate in the clockwise direction. For this reason each of the spindles 101 is operatively connected with the fixed gear 40a on support 33a by means of a set of reversing gears as shown in FIG. 12, and in greater detail in FIG. 14.

Thus the gear or pinion 103 on each spindle 101 meshes with a large gear 104, which is fixed to the side of a smaller gear 105, the teeth of which mesh with the teeth of stationary gear 40a. The two companion gears 104 and 105 rotate on a common shaft 106 which projects forwardly from the side of carriage 37a (FIG. 16). Each of gears 104 being disposed in side-by-side contact with its companion gear 105, rotates in the circular groove 100 shown in FIG. 15 and also in FIGS. 12 and 14. As carriage 37a rotates around shaft 35a carrying the spindles and mandrels in a circular path around the support 33a, the meshing of gear teeth 40a with those of gear 105 serves to drive gear 104 which in turn drives gear 103 secured to spindle 101, with its mandrel 102.

The carriage 37a, which like carriage 37 has spur gear teeth 43a on its periphery, is rotated by an electric motor (not shown) which drives a spur gear (also not shown), the teeth of which mesh with teeth 43a. Like the driving motor for section 1 of the apparatus, the driving motor for section 2 is also provided with a variable speed mechanism (not shown) so as to be able to regulate the output of section 2.

The construction of expansion mandrel 102 is shown in FIGS. 13, 15, 17 and 18. The purpose of this mandrel is to frictionally engage the interior surface of a cap and secure it to the mandrel during the shaving or polishing operation. For engaging the interior of the cap the mandrel is provided with a slotted sleeve 107. This sleeve is slotted, as indicated at 108, alternately from the opposite ends of the sleeve. The slots 108 divide the cylindrical sleeve into a series of parallel sections or bars 109 which are connected to one another at their opposite ends as shown in FIGS. 15 and 16, thereby forming a cylindrical structure, the elements of which are flexible and resilient.

The opposite ends of the slotted sleeve are provided with internal cam surfaces 110 and 111 (FIG. 13), and these cam surfaces are engaged by expansion cam members 112 and 113 which have oppositely directed inner conical portions arranged to engage the respective cam surfaces 110 and 111 of the slitted sleeve 107. These members are arranged for telescopic lengthwise movement with respect to one another as shown in FIG. 13, and are secured to spindle 101 so as to rotate therewith by means of a key 114.

Cam 112 is mounted in stationary position on spindle 101 and cam 113 is mounted for axial movement. Such movement is imparted to cam 113 by means of a rod 115 which extends from end to end of spindle 101. To impart the axial movement to rod 115, spindle 101 has at its rear end a pair of coacting cam members 116 and 117 which are arranged for limited rocking movement on rod 115. These members have coacting sloping cam surfaces 118 (FIGS. 17 and 18). Cam member 116 is mounted in fixed position with respect to carriage 37a, and cam 117 is arranged for a limited rocking movement with respect to cam 116.

The mounting of cam member 116 on carriage 37a is shown in FIG. 17. This cam member is received in a circular recess in the carriage at the rear of spindle 101. It may have a press fit in this recess, or may be keyed against rotation as indicated at 120.

When cam 117 is rocked counterclockwise with respect to member 116, the coacting sloping cam surfaces 118 force cam member 117 outwardly or to the right. This motion is transmitted to rod 115 through a ball bearing 121 (FIG. 13), and a nut threaded on the end of the rod. The longitudinal motion of rod 115 causes the opposite ends of the slotted mandrel member 107 to be squeezed between the two cam surfaces 110 and 111. This causes expansion of the member 107 so that it will frictionally secure thereon a formed cap 87 which has been previously placed on the mandrel.

In order to actuate the cam mechanism above described so as to either secure a cap onto mandrel 102, or to release the cap thereon, cam 117 is provided with two projecting bosses 122 and 123. As shown in FIG. 17, boss 122 projects radially upward when the cam surfaces 118 are in the position here shown, which is the release position of the expansion mandrel 102. Arranged at the left or trailing side of the in-feed position 14, and at a position slightly in advance of the discharge position 15 (FIG. 12) are stationary horizontal rods 124 and 125. Rod 124 is mounted at the top of a supporting bracket 126 which projects upwardly from the hub of frame 34a to which it is secured by screws 127 (FIG. 17). Rod 125 is similarly mounted at the outer end of a second bracket 128 shown only in dotted lines in FIG. 12. This bracket may be mounted on the frame 34a in a manner somewhat similar to that described in connection with bracket 126.

As each of the successive spindles 101 passes the upper rod 124 the boss 122 for this spindle strikes the rod, and cam member 117 is rotated in a counterclockwise direction (FIG. 18). This causes the coacting cam surfaces 118 to ride on one another forcing cam member 117 and rod 115 outwardly or to the right as shown in FIGS. 13 and 17. Thus the formed cap member 87 which has just been applied to mandrel 102 at in-feed position 14 is firmly secured to this mandrel by the expansion of the slitted sleeve member 107.

The shaving operation which polishes off or removes the upper extremities of the embossing 47 is accomplished by carrying the individually formed caps 87 over the surface of a toothed shaving die 129 while rotating the cap in a direction opposite to the forward movement along the arcuate surface of this die. Die 129 is an arcuate member as shown in FIG. 12, and on its outer arcuate surface is provided with uniformly spaced teeth 130 (FIGS. 14 and 16). Teeth 130 advantageously are of the undercut type, as shown in FIG. 14, with their edges directed opposite to the direction of advance of the spindles 101 and mandrels 102 carrying the rotating caps.

The directions of rotation are shown by the arrows in FIG. 14, the rotation of carriage 37a being counterclockwise. The rotation of the spindles 101 and mandrels 102 being clockwise because of the presence of the reversing driving gears 104 and 105, the surface of the cap 87 is brought into shearing engagement with the edges of teeth 130 by its own rotation as well as by the rotation of carriage 37a. The rotational speed of the spindles is about 840 r.p.m. Teeth 130 extend diagonally across the face of shaving die 129 as shown in FIG. 16, the width of this die member being coextensive with the skirt portion 5 of the cap so as to perform the shaving operation on the embossing 47 regardless of the position of the embossed matter with respect to the height of the skirt. As indicated in FIG. 14, the teeth 130 are advantageously on an arc which is disposed outwardly from gear teeth 40a.

By comparing the enlarged sectional views 15B and 15C, it will be understood that the passage of each rotating cap 87 over shaving die 129 causes the removal of the extremities of the embossed matter including the entire thickness of the layer of color coating 28 over the embossed material 47, such as the large letter E shown in FIG. 15A, and including also the surface of the metal sufficiently to make the natural color of the metal stand out brightly in contrast to the color 28.

The shaving die 129 is supported along its inner edge (FIG. 2) against the circular shelf 73a so that the die is firmly held against inner movement in the radial direction. The die is secured in this position by means of screws 131 which are received in threaded openings in the support member 33a.

A circular plate 132 covers the ends of all the rotating mandrels 102, although in this section 2 of the apparatus the purpose of this plate is solely as a protection to the operator of the machine, inasmuch as the individual formed caps 87 are tightly secured on the slotted sleeves 107 of the expansion mandrels 102, from a time shortly after each cap is received on its mandrel at in-feed position 14, to the time it is discharged therefrom at position 15. Plate 132 is held in position by suitable screws, such as shown at 133 in FIG. 15.

The in-feed cap mechanism at position 14 is indentical with that shown in FIGS. 9 and 10, except that the cam surface 67 performs no function inasmuch as stationary rod 124 operates the expansion mandrel 102 to clamp the cap in position thereon before the mandrel reaches cam surface 67. Since the cap slides freely onto the mandrel the air jet from the nozzle which corresponds to nozzle 60 moves the cap fully into position to be clamped.

The operation of discharging or ejecting the caps at discharge position 15 (FIG. 12) is identical with that previously described and shown in FIG. 11. That is to say, the ejection is accomplished by means of an air jet from nozzle 89a for impelling the completed cap longitudinally off the end of the contracted mandrel 102, and the cap is received by a cage (not shown) similar to cage 88, which directs the cap into position between a pair of flights of the endless conveyor 16. The air jet just referred to passes through a longitudinal aperture 134 in rod 115 (FIG. 13) of each of the spindles 101. The jet thus impinges against the inside surface of the top of the cap.

The shaving apparatus is provided with air control valves 135 and 136 which are similar in all respects to valves 61 and 93 shown in FIG. 2. These valves are operated in timed relation to the movement of the spindles 101 to respective positions 14 and 15, each valve being rotated by means of a gear which meshes with the teeth 43a on carriage 37a. It will be understood that air control valve 135 is connected to nozzle 60a at in-feed position 14 (FIGS. 12 and 17) by means of suitable tubing, and that control valve 136 is similarly connected with nozzle 89a (FIG. 13).

The conveyor 16 is also driven in the same way as conveyor 11 (FIG. 2) by an endless driving chain 137 which corresponds to chain 82 in FIG. 2. This chain is driven by a gear 138 from gear 43a by a mechanism identical with that shown in FIG. 2A.

We claim:

1. In a machine for finishing cup-like metallic closures for bottles or other containers, the closures having skirt portions with embossed matter thereon, a stationary shaving die having cutting teeth projecting therefrom, a rotating mandrel having a closure member secured thereto, and means for moving the rotating mandrel into cooperative relation to the die so as to cause the teeth thereof to engage the embossed matter and remove the extremities of such matter.

2. A machine for finishing cup-like metallic closures as set forth in claim 1 wherein the width of the shaving die corresponds with the width of the skirt portion of the closures, the teeth of the die member extending obliquely throughout the width thereof.

3. In a machine for finishing cup-like metallic closures for bottles or other containers, the closures having skirt portions with embossed matter thereon, a stationary die member having shaving teeth projecting therefrom, a rotating mandrel including mechanism for securing thereto a closure telescoped thereon, means for placing a closure on the mandrel and for actuating the mandrel mechanism to secure the closure thereto, means for thereafter moving the rotating mandrel into cooperative relation to the die member so as to cause the teeth thereof to engage the embossed matter on the skirt of the closure and remove the extremities of such matter, and means for thereupon actuating the mandrel mechanism to release and discharge the closure therefrom.

4. In a machine for finishing cup-like metallic closures for bottles or other containers, the closures having embossed matter on their skirt portions, a stationary circular support having gear teeth throughout the periphery, constituting a sun gear, a carriage mounted for rotation adjacent the support, a plurality of spindles in equally spaced position around the carriage and mounted for rotation thereon, each of the spindles carrying pinion teeth, gearing interconnecting each of the spindles and the sun gear, the spindles each having at their front ends and projecting over the periphery of the support an expansion mandrel for carrying a closure, means for rotating the carrier to cause the spindles and mandrels to rotate and to move in a circular path adjacent the circular support, means for feeding and positioning closures on the successive mandrels at a predetermined point in the circular path of the mandrels, means for causing the successive mandrels to engage and secure the respective closures thereto so that the closures rotate with the mandrels, a die member mounted in fixed position on the circular support, said member having an arcuate outer surface from which a series of cutting teeth project into the path of the surfaces of the successive closures as they are carried by the mandrels around the periphery of the circular support, the interconnecting gearing being arranged to rotate the spindles in a direction opposite to the movement of the mandrels in their circular path and causing the extremities of the embossed matter to be shaved off, and means for disengaging and removing the closures from the mandrels.

5. In a machine for making metallic closures having a plurality of mandrels arranged in a circle, means for rotating the mandrels on their individual axes and simultaneously moving them in a circular path, such path being adjacent to at least one stationary die member for performing an operation on closure blanks carried on the mandrels, means for feeding individual blanks to the successive mandrels at an in-feed position with respect to the circular path of mandrel travel, a discharge position at a succeeding point in said path of travel, an endless flight conveyor disposed alongside of the path of travel at the discharge position, and means for transferring the individual closures to such conveyor at the discharge position including a horizontal cage member extending from a point adjacent the side of the path of mandrel travel to a point over the discharge conveyor, an air nozzle disposed on the opposite side of the mandrel path from the endless conveyor, and an air control valve operated in timed relation to the movement of the mandrels in their circular path to cause an air jet to issue from the nozzle as each mandrel reaches the discharge position, such air jet passing through the mandrel and impinging on the interior of the closure and moving it through the cage and onto the conveyor, and means for causing the mandrel to engage and disengage the closures comprising a hollow expansible sleeve member and two relatively axially shiftable supporting members mounted on the end portion of each spindle and having cam surfaces engaging the opposite inner edges of the expansible sleeve, one of the shiftable members being operatively connected to a rod which extends through an aperture through the spindle to the rear end thereof, and cam mechanism adjacent the rear end of the spindle having an actuating member mounted for rocking movement on the rod and having an upwardly extending projection, means disposed at a predetermined angular position on the circular path of the mandrels for engaging the projection and causing the expansion of the expansible sleeve, and means at another angular position for engaging said actuating member and causing contraction of the expansible sleeve.

6. A machine for finishing cup-like metallic closures as set forth in claim 3 wherein the means for causing the mandrels respectively to secure the closures thereto and release them therefrom comprises a hollow expansible sleeve member and two relatively axially shiftable supporting members mounted on the end portion of each spindle and having cam surfaces engaging the opposite inner edges of the expensible sleeve, one of the shiftable members being operatively connected to a rod which extends through an aperture through the spindle to the rear end thereof, and mechanism adjacent the rear end of the spindle for shifting the rod for causing expansion or contraction of the expansible sleeve thereby effecting the securing and releasing of the closures.

7. In a machine for making metallic closures having a plurality of mandrels arranged in a circle, means for rotating the mandrels on their individual axes and simultaneously moving them in a circular path, such path being adjacent to at least one stationary die member for performing an operation on closure blanks carried by the mandrels, and means for causing the mandrels respectively to secure the closures thereto and release them therefrom comprising a hollow expansible sleeve member and two relatively axially shiftable supporting members having cam surfaces for engaging the opposite inner edges of the expansible sleeve member, and means for axially shifting the supporting members to cause respective expansion and contraction of the expansible sleeve member thereby effecting the securing and releasing of the closures.

8. In a machine for making metallic closures having a plurality of mandrels arranged in a circle, means for rotating the mandrels on their individual axes and simultaneously moving them in a circular path, each of the mandrels having a plurality of circular work shaping tools secured thereto side-by-side and a floating flaring tool adjacent the innermost work shaping tool, and cooperating stationary die members mounted adjacent said path, in-feed and out-feed stations, means at the in-feed station for feeding elongated cup-like metallic blanks to the successive mandrels with the skirt portion of each blank surrounding the mandrel, means for maintaining said flaring tool in axial parallelism with the mandrel but permitting free lateral movement thereof, and means for forcing the closure member on to the flaring tool.

9. A machine for making metallic closures as set forth in claim 8 in which the means for forcing the closure onto the flaring tool comprises a cam member disposed near the in-feed position constructed and arranged to engage the outer end of the closure member which has been received on the mandrel at said station, said cam member coacting with the end portion of the closure to force the closure onto the flaring tool as the carriage advances the mandrel, thereby forming on the closure member a flared portion of predetermined width.

10. In a machine for making metallic closures of elongated cup-like form, a forming section and a finishing section, each of said sections including a plurality of mandrels for receiving the skirt portions of elongated cup-like members and arranged in a circle, means for rotating the mandrels on their individual axes and simultaneously moving them in a circular path, cooperating forming tools on the mandrels of the first section and on a stationary support adjacent said path for beading scoring, knurling and embossing the skirt portions of the cup-like members. and on the second section of the apparatus cooperating tools on the mandrels and on a second stationary support for shaving the tip portions of the embossed matter on the exterior surfaces of the skirt portions of the cup-like members, an in-feed station and a discharge station for each of the apparatus sections, means for feeding cup-like metallic blanks to the successive mandrels at the in-feed station of the first apparatus section, mechanism for discharging the formed cup-like members at the discharge station of the first apparatus section including a conveyor for raising the formed cup-like members to the intake and of a feed chute leading to the in-feed station of the second apparatus section, said feed chute being tilted to one side of the vertical, and a door in the lower tilted side thereof which is pivoted at its upper end to the chute, the door being spring-held in closed position and openable by the pressure of the cup-like closure members in the chute in the event of shutdown of the second apparatus section while the first section continues to operates, and means at the discharge station of the second section for removing the individual completed closures therefrom.

References Cited by the Examiner
UNITED STATES PATENTS

| | | | |
|---|---|---|---|
| 2,308,276 | 1/1943 | Gibbs | 113—121 |
| 3,217,397 | 11/1965 | Voss | 113—121 |

CHARLES W. LANHAM, *Primary Examiner.*

RICHARD J. HERBST, *Examiner.*

R. D. GREFE, *Assistant Examiner.*

UNITED STATES PATENT OFFICE
CERTIFICATE OF CORRECTION

Patent No. 3,311,077                                March 28, 1967

Charles Andrew et al.

It is hereby certified that error appears in the above numbered patent requiring correction and that the said Letters Patent should read as corrected below.

Column 2, line 14, for "one" read -- on --; column 3, line 12, for "there of" read -- thereof --; line 68, for "or" read -- of --; column 5, line 23, for "the", second occurrence, read -- they --; line 38, for "shells 8" read -- shells 3 --; line 39, for "chute 3" read -- chute 8 --; column 11, line 53, for "in" read -- of --; column 13, line 41, strike out "and"; column 14, line 30, for "and" read -- end --; line 38, for "operates" read -- operate --.

Signed and sealed this 7th day of November 1967.

(SEAL)
Attest:

Edward M. Fletcher, Jr.                                EDWARD J. BRENNER

Attesting Officer                                                 Commissioner of Patents